Aug. 17, 1948.   A. B. WELTY, JR., ET AL   2,447,043
HYDROFORMING PROCESS
Filed Aug. 24, 1944
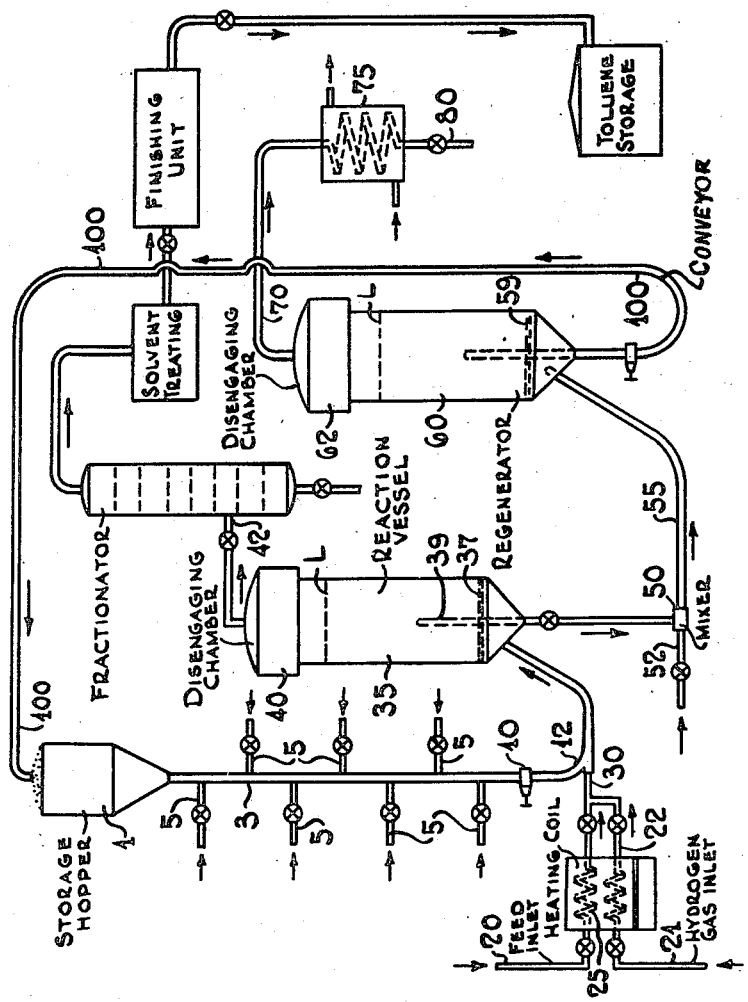
Albert B. Welty Jr.   Inventors
Clinton H. Holder
By _____ Attorney

UNITED STATES PATENT OFFICE 2,447,043

HYDROFORMING PROCESS

Albert B. Welty, Jr., Mountainside, and Clinton H. Holder, Cranford, N. J., assignors to Standard Oil Development Company, a corporation of Delaware Application August 24, 1944, Serial No. 551,038

2 Claims. (Cl. 196—53)

The present invention relates to improvements in the art of reforming, and more particularly it relates to a continuous method of reforming naphthas which may be accomplished more expeditiously and cheaply than heretofore possible.

Hereinafter the term "hydroforming" refers to a catalytic operation carried out in the presence of a reforming catalyst, such as a sixth group oxide supported on active alumina and in the presence of added hydrogen, the principal chemical reaction being one in which dehydrogenation of hydrocarbons takes place, but is also accompanied by certain other reactions such as isomerization, polymerization, and the like.

Until recently all catalysts used in hydroforming have been subject to oxidation and reduction. Hydroforming is a cyclic process, that is, the catalyst is alternately used for reaction, then regenerated. The result is that the catalyst is oxidized during regeneration and reduced during the reaction period (actually during the purging with hydrogen-containing recycle gas just preceding each reaction period). This is evidently the result of oxidation and reduction of the activating metal oxide. For example, in the case of a molybdenum oxide-alumina catalyst the reaction that takes place may be represented approximately as follows:

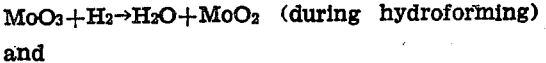

and

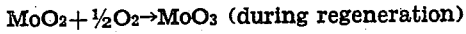

Actually the reactions may be somewhat more involved than shown. One result of this alternate oxidation and reduction is that air is required during the regeneration over and above that used up in burning coke formed during the reforming phase. In the case of a typical molybdenum oxide-alumina catalyst this additional amount of air is 50–100 cubic feet per cubic foot of catalyst. In the case of certain chromium oxide-alumina catalysts tested, the excess air amounts to 175 cubic feet per cubic foot when the catalyst is freshly prepared and 40–50 after use. The molybdenum oxide type catalysts are generally used in hydroforming and we shall confine the remaining discussion to this kind for purposes of illustrating. The amount of air required in excess of that required for burning coke over a given period of time will depend on the length of cycle employed. The more frequently the catalyst is regenerated, the more excess air will be required. If a typical cycle length and feed rate, 8 hours (4 hours reaction and 4 hours purging and regeneration), is used and the feed rate is 0.65 volumes of feed per volume of catalyst per hour, it is found that the 50–100 cubic feet of air per cubic foot of catalyst is equivalent to the air needed to burn 0.2–0.4 weight per cent carbon (as coke) based on feed. It is readily seen that if the reaction period is decreased, this coke equivalent of the excess air in terms of feed stock increases because less oil is fed per reaction period. For example, decreasing the reaction period from four hours to one hour would increase the coke equivalent of the excess air required to 0.9 to 1.8 weight per cent on feed. This is very appreciable in comparison with the 0.1–0.3 actual weight per cent coke ordinarily formed when operating to make toluene from a feed containing methylcyclohexane. Under more severe conditions actual coke may amount to as much as 2.0–3.0 weight per cent on feed, however.

According to our present invention, we employ a modified hydroforming catalyst and are able to change hydroforming technique fundamentally, as will appear more fully hereinafter. We use a hydroforming catalyst containing an alkaline earth oxide, such as CaO.

An advantage of our process is that we are able to employ a "fluid" catalyst process rather than a stationary bed of catalyst, which has heretofore been used exclusively in commercial hydroforming. As is known in fluid catalyst technique, the catalyst is in the form of a relatively fine powder and during regeneration is mixed with the regeneration gas in the regeneration zone. When using the ordinary reforming catalyst in this fluid catalyst type of operation, the catalyst is resident in the reaction zone for only about five minutes. Employing the usual catalyst, if as complete oxidation (during regeneration) and reduction (during purging and hydroforming) took place in this type of operation as when using the longer periods in the stationary bed, the coke equivalent of the excess air required would be from 11–22 weight per cent based on the feed. Of course, this would be prohibitive and render the process entirely impractical from a commercial standpoint. This situation, however, may be alleviated somewhat due to the fact that the oxidation and reduction in the regeneration zone and the reforming zone, respectively, would not be as complete in the fluid catalyst process as in the stationary bed type operation because of the relative shortness of the cycle. But in any event the air required for oxidation of the catalyst itself would be very great and will, in most cases, exceed the air required for burning coke. However, the additional air it is necessary to supply to reoxidize the catalyst is not the only disadvantage of the catalyst which is subject to oxidation and reduction. When the air oxidizes the catalyst per se, about as much heat is evolved per unit of oxygen consumed as when the oxygen is used to burn the coke in the fouled catalyst during regeneration; therefore, facilities for heat removal must be greatly increased using the ordinary reforming catalyst in the fluid catalyst type of operation.

We have found (as indicated previously) that the disadvantages of applying the fluid catalyst type of operation using sixth group oxide catalysts can be minimized or eliminated by modifying the catalyst. For example, by inclusion of calcium oxide in the molybdenum oxide-alumina catalyst in approximately 1:1 mole ratio of calcium to molybdenum, the alternate oxidation and reduction can be essentially eliminated, that is to say, during the hydroforming operation the catalyst is not reduced and therefore it is not necessary to reoxidize it during regeneration. Calcium oxide can be used to stabilize not only molybdenum oxide-alumina catalyst, but it can also be used to stabilize chromium oxide-alumina catalyst or any oxide catalyst which is subject to oxidation-reduction, such as tungsten oxide, iron oxide, cobalt oxide, nickel oxide, manganese oxide and the like. Also, instead of using calcium oxide for stabilization purposes, we may use the oxides of the second group of the periodic table, generally, and in particular oxides such as magnesium oxide, strontium oxide and barium oxide.

Another feature of our invention involves using a spinel type compound, such as zinc aluminate or zinc spinel, as it is often called, as the catalyst support or carrier, in place of active alumina. This feature is important for the zinc spinel increases the activity of the catalyst, particularly in that the zinc spinel increases the cyclicizing action of the catalyst so that not only are naphthenes in a feed converted to aromatics, but also the paraffins invariably present in the reaction zone are cyclicized and/or aromatized and converted into aromatics. Hence, using a zinc spinel base, the overall yield of aromatics from a given quantity of virgin naphtha is greater than where the active oxide is supported on, say, active alumina or other known supports.

In preparing the spinel base catalyst, we may employ the technique disclosed in the application of Kenneth K. Kearby, Serial No. 521,663, filed February 9, 1944, which is now abandoned. Thus one good way to proceed, disclosed in said application, is as follows:

Example 1

Solution A.—974 g. of C. P. zinc nitrate ($Zn(NO_3)_2.6H_2O$) was dissolved in a solution of 179 cc. concentrated nitric acid in 2 liters of distilled water and made up to a volume of 3290 cc.

Solution B.—80 g. pure NaOH was dissolved in 4 liters of distilled water. 800 g. of sodium aluminate was stirred in rapidly. After stirring for two minutes, 500 cc. of a diatomaceous earth filter aid was added. Stirring was continued for one-half minute and the suspension was filtered on a Buchner funnel. 3290 cc. of the filtrate was used for solution B. The resulting solution had a concentration of 101 g. $Al_2O_3$ and 87 g. $Na_2O$ per liter. On this basis, the acidity of the zinc nitrate (Solution A) was adjusted to exactly neutralize the alkali of the alumina solution.

Solutions A and B were added at equal rates over a period of 30 minutes to 10 liters of distilled water while stirring. Stirring was continued for 15 minutes after all of A and B had been added and the precipitate filtered. The precipitate was washed with 6 liters $H_2O$, restirred in 12 liters of water, filtered and washed with 6 liters $H_2O$. The precipitate was dried and calcined 3 hours at 1000° F. The zinc aluminate is placed in a solution of calcium nitrate in distilled water containing 375 grams of calcium nitrate per liter (2.5 cc. of solution per gm. of zinc aluminate). The mixture is stirred for four hours. The solid material was filtered and was then dried at 250° F. The dried powder was then heated at about 750° F. until most of the nitrate has been decomposed. The temperature was then increased to 1250° F. and maintained for 6 hours.

The ignited calcium-oxide containing zinc aluminate was mixed for 3 hours in the ball mill with a solution of 81.8 g. of C. P. ammonium molybdate dissolved in a solution of 44 cc. concentrated ammonium hydroxide in 440 cc. $H_2O$. (Additional water was added, sufficient to form a thick paste before mixing.) The mixture was dried, pilled and calcined for 3 hours at 1200° F.

The foregoing example is obviously purely illustrative and any technique for incorporating calcium molybdate into a spinel, particularly a zinc aluminate spinel, may be used. In like manner calcium chromate supported on or impregnated into a spinel base gives a good catalyst for "hydroforming" naphthas. We have termed calcium molybdate, strontium molybdate, calcium chromate, etc., "stabilized oxides" which means that the oxide of molybdenum or chromium does not undergo valency change during a passage through an oxidation zone and a reduction zone. Similarly, tungsten oxide in equimolecular proportion with calcium oxide may be present.

With respect to the amount of spinel with respect to the stabilized oxide, we use a preponderance of the spinel carrier, i. e. over 50 weight per cent up to 95 weight per cent, the balance being substantially the stabilized oxide.

In the accompanying drawing, we have shown for purposes of better illustrating our invention a flow plan depicting diagrammatically an apparatus layout in which our invention may be performed.

Referring to the drawing in detail, powdered catalyst composed of 10% by weight of molybdenum oxide, about 4% by weight of calcium oxide (chemically combined with the molybdenum oxide), and the balance or 86% by weight being active alumina, said catalyst having a particle size of from 0–100 microns and preferably predominantly around 20–30 microns, is withdrawn from a storage hopper 1 and discharged into a standpipe 3. The standpipe 3 carries a plurality of taps 5 by means of which a gaseous material is injected for the purpose of fluidizing the downflowing powdered catalyst. A flow control valve 10 is disposed at the bottom of standpipe 3.

In order to further illustrate our invention, we shall describe a method of hydroforming a naphtha fraction to form toluene. To this end a naphtha containing at least 30% naphthenes, and preferably 60–70%, boiling within the range of from 200–240° F. is introduced into the present system through line 20 and thence heated in a fired coil 25 to a temperature of around 500° F. whereupon it is withdrawn through line 30 and then discharged into the lower bend 12 of the standpipe 3. Hydrogen or a gas rich in hydrogen is introduced into the present system through line 21 and heated in a separate coil 22 to a temperature of about 500° F. and then discharged into line 30. In the lower bend of standpipe 3, after the vaporized naphtha has been injected, there is contained a fluidized mixture of catalyst, naphtha, hydrogen, and the gas added through taps 5, the latter gas being natural gas, nitrogen, hydrogen, recycle gas (hydrogen and hydrocarbon gases), normally gaseous hydrocarbons from petroleum sources, and the like, but preferably steam is avoided. The fluidized mass is discharged from the standpipe into a reaction vessel 35, passing through a foraminous member 37 which may be an ordinary screen or grid plate serving the purpose of increasing the distribution and uniformity of flow of the fluidized mass into the main body of the reactor. The flow of gas or vapor in the reactor 35 is controlled so that its superficial velocity is from ⅓–5 ft. per second, preferably from 1½ to 3 ft. per second, whereupon there is formed within the reactor a dense, fluidized mass having the flow characteristics and static pressure of a fluid, like water. This mass may weigh 15–70 lbs. per cu. ft. preferably 15–40 lbs. per cu. ft. It is characterized by a series of vertical and cross currents extending from the grid plate to an upper level designated L, with the net result that a thorough and complete mixing is achieved and therefore all portions of the mass are at substantially the same temperature. It will be noted that the naphtha was heated to only about 500° F. in the heater 25 because in the type of operation described the catalyst from hopper 1 is in heated condition as a result of a prior regeneration, as will subsequently appear more fully hereinafter.

The reactants pass upwardly into a disengaging chamber 40 where the superficial velocity of the vapors is decreased to the extent that the main bulk of the catalyst carried therein gravitates back into the space between grid plate 37 and upper level L. In other words, the superficial velocity of the vapors in disengaging chamber 40 is of the order of ½ ft. per second, or less, and at this low velocity the catalyst settles out and descends to the lower portion of the reaction vesssel. The vapors are withdrawn overhead through line 42 and they may be delivered to fractionating equipment, solvent treating equipment, etc. to recover toluene. We have merely indicated diagrammatically in the drawing the processing of the vapors in the line 42 because any conventional known method for recovering toluene and other valuable products may be used, and the purification of the toluene does not form the gist of our invention. In passing, it may be said that it is preferable to interpose in line 42 suitable solid-gas contacting devices, such as centrifugal separators, electrical precipitators, etc. to remove the catalyst which may be entrained therein in small amounts; that is to say, the gases exiting in line 42 from disengaging space 40 may contain ½ of 1% or thereabouts, of the catalyst, and to remove this entrained catalyst the vapors are subjected to the treatment referred to.

Referring to the drawing, it will be noted that we provide a draw-off pipe 39 through which catalyst may be withdrawn continuously from the reactor and discharged into a mixing means such as an injector 50 where it is mixed with air or other oxygen-containing gas discharged into the mixer 50 through line 52 to form therein a fluidized mass of spent catalyst in oxygen-containing gas, which fluidized mass is then withdrawn through line 55 and discharged into a regeneration vessel 60 similar in construction to the reactor 35 and preferably disposed at a somewhat lower level. The fluidized spent catalyst passes upwardly through a screen or grid distributing plate 59 into the regenerator 60 where, as in the case of the reaction vessel, the superficial velocity of the gas is regulated from 1–5 or 6 ft. per second, preferably 1½ to 3 ft. per second to form in the regenerator a fluidized, turbulent mass of catalyst dispersed or mixed with regeneration gas of about the same density as the material in the reactor. The contaminants which are formed on the catalyst during the reforming operation, and which of course are carbonaceous in nature, are burned off in the regeneration vessel. The gaseous products of regeneration pass into a disengaging chamber 62 where they are disengaged from the main bulk of catalyst, the latter being discharged into the regeneration vessel and the regeneration gas passing overhead through line 70. This regeneration gas may contain some entrained catalyst and, if so, it is passed through dust separators, electrical precipitators, and the like, and then the gas may be passed through a waste heat boiler 75 to recover, for use in the system, at least a portion of its sensible heat, whereupon the gases are vented from the system through line 80. The regenerated catalyst may be continuously withdrawn from the regenerator through a bottom draw-off pipe 100 and then conveyed by any suitable means, such as Redler conveyor, to hopper 1 for reuse in the process.

As to operating conditons, the following give good results:

*In the reactor*

| | |
|---|---|
| Temperature °F | 850–1050 |
| Pressure lbs. per sq. in. ga | 0–500 |
| W/hr./W | 0.25–5.0 |
| Residence time of catalyst mins | 0.25–60 |
| Cu. ft. of hydrogen containing recycle gas per barrel of oil | 500–5000 |

*In the regenerator*

| | |
|---|---|
| Temperature °F | 1000–1400 |
| Pressure lbs. per sq. in. ga | 0–500 |
| Residence time of catalyst mins | 0.5–15 |

It will be understood that the details of operation which we have hereinbefore set forth are purely illustrative and do not per se impose any limitation on our invention. So far as we know we are the first to devise a practical method for hydroforming catalytically, using the hereinbefore described fluid catalyst process. It has been impractical to employ this type of process heretofore due to the aforementioned instability of the molybdenum oxide, chromium oxide, and the like, and by using the calcium or other stabilizing oxide we are enabled to pass the catalyst through the hydroforming zone and the regeneration zone without causing it to undergo change in valence or oxidation and/or reduction.

While this new class of catalysts is particularly adapted for use in a "fluid" catalyst type of operation, they may be used in the conventional operation, i. e., in the form of a stationary bed or beds, with good results.

To recapitulate, our present invention relates primarily to reforming naphthas using a stabilized oxide catalyst, but includes any operation performed on hydrocarbons involving dehydrogenation, aromatization, cyclization, etc., and where "coke" or carbonaceous deposits are formed on the catalyst during the reaction, and has for its main purpose a saving in regeneration volume and utilities during regeneration of the catalyst by burning off the said "coke," since the active component of the catalyst during the productive reaction is stabilized against valence change or reduction. This stabilization of the catalyst obviates the necessity of re-oxidizing the catalyst with its attendant saving of air and heat controlling utilities. Since oxidations are exothermic provisions must be made to remove heat ordinarily to prevent injury to the catalyst. Hence, the saving of regeneration volume and cooling means afford the main advantages of our invention, coupled of course, with the saving in time required to recondition a fouled catalyst of the type here involved.

For simplicity sake, we have not shown separation of hydrogen from the reaction gases and its recycling to coil 22 for further use in the process because this also is well known to the art and does not form a part of the present invention. It will be understood, of course, that all the expedients of recycling hydrogen, solvent treating, fractionation, distillation, etc. are expedients which may be used as part of our process.

What we claim is:

1. A hydroforming process which comprises establishing a fluidized mass of powdered hydroforming catalyst carried on a support, said catalyst including a metallic oxide normally tending to be reduced by hydrogen under the conditions of reaction, said metallic oxide being selected from the class consisting of molybdenum, chromium and tungsten oxides and said metallic oxide being chemically combined mole for mole with calcium oxide, continuously feeding powdered catalyst and gasiform hydrocarbons into a reaction zone containing said fluidized mass, permitting the hydrocarbons and catalyst to contact each other in the reaction zone in the presence of added hydrogen for a sufficient period to effect the desired reaction, withdrawing reaction products, purifying and recovering the same, separately withdrawing a fluidized stream of spent catalyst in substantially unreduced condition but containing carbonaceous deposits, conveying the spent catalyst to a separate regeneration zone, establishing within said regeneration zone a fluidized mass of catalyst, intermixed with an oxidizing regeneration gas in amount not substantially in excess of that required to burn off carbonaceous deposits, permitting the regeneration gas to contact the catalyst at a sufficiently elevated temperature to cause burning of the carbonaceous deposits, separating the catalyst from the gases and recycling a fluidized stream of regenerated catalyst while still hot to the reaction zone.

2. A hydroforming process according to claim 1 wherein said support comprises zinc spinel.

ALBERT B. WELTY, JR.
CLINTON H. HOLDER.

REFERENCES CITED

The following references are of record in the file of this patent:

UNITED STATES PATENTS

| Number | Name | Date |
| --- | --- | --- |
| 1,732,381 | Schmidt et al. | Oct. 22, 1929 |
| 2,278,223 | Sturgeon | Mar. 31, 1942 |
| 2,304,168 | Heard | Dec. 8, 1942 |
| 2,311,979 | Corson | Feb. 23, 1943 |
| 2,341,193 | Scheineman | Feb. 8, 1944 |
| 2,344,330 | Sturgeon | Mar. 14, 1944 |
| 2,351,624 | Mavity | June 20, 1944 |
| 2,360,463 | Arveson | Oct. 17, 1944 |
| 2,367,530 | Ruthruff | Jan. 16, 1945 |
| 2,380,035 | Edson et al. | July 10, 1945 |
| 2,387,989 | Foster | Oct. 30, 1945 |
| 2,422,372 | Smith | June 17, 1947 |

FOREIGN PATENTS

| Number | Country | Date |
| --- | --- | --- |
| 268,774 | Great Britain | Mar. 28, 1927 |